March 13, 1962
R. GOUIRAND
3,025,079
PNEUMATIC VEHICLE SUSPENSION
Filed Oct. 22, 1958
2 Sheets-Sheet 1
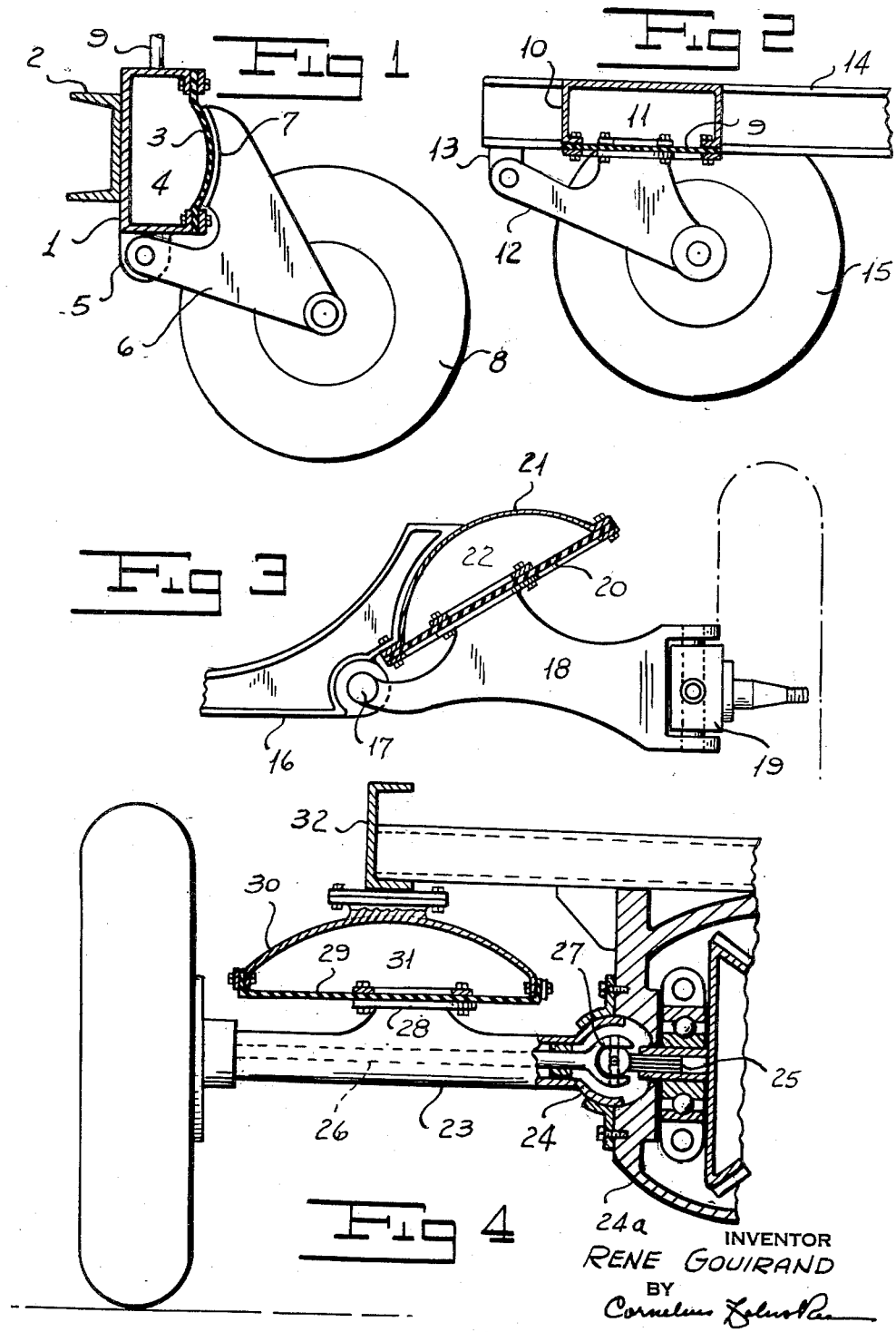
INVENTOR
RENE GOUIRAND
BY
Cornelius Zelner Pau
ATTORNEY March 13, 1962  R. GOUIRAND  3,025,079
PNEUMATIC VEHICLE SUSPENSION
Filed Oct. 22, 1958  2 Sheets-Sheet 2

INVENTOR
RENE GOUIRAND
BY
Cornelius Zahrestee
ATTORNEY

United States Patent Office
3,025,079
Patented Mar. 13, 1962

3,025,079
PNEUMATIC VEHICLE SUSPENSION
Rene Gouirand, 210 W. 88th St., New York, N.Y.
Filed Oct. 22, 1958, Ser. No. 768,894
1 Claim. (Cl. 280—124)

This application is a continuation-in-part of my allowed pending application Serial No. 390,540, filed November 6, 1953 and now Patent No. 2,882,067, dated April 14, 1959. It embodies certain structures, claims for which were divided out of said application as well as certain additional novel suspensions.

The primary object of the present invention is to provide pneumatic suspensions capable of supporting the body of a vehicle for easy riding.

A further object of the invention is the provision of pneumatic suspensions which will be extremely flexible and thus self adjusting to uneven road surfaces whereby the tires are subjected to uniform wear and the body and chassis frame of the vehicle are relieved of undesirable twisting and bending stresses.

The invention embodies many novel features described in detail in the accompanying specification and claim, when read in conjunction with the accompanying drawing.

The drawing illustrates different practical embodiments of the invention, the constructions therein shown being illustrative, only, and not as defining the limits of the invention.

FIG. 1 is a side elevation of a front wheel suspension showing the chassis frame and the pneumatic chamber in section.

FIGURE 2 is a like view showing a modified form of construction.

FIG. 3 shows a further modified form of the invention for supporting the forward portion of the vehicle.

FIG. 4 shows another modified form of the invention adapted primarily for the support of the rear portion of the vehicle.

Figure 5:
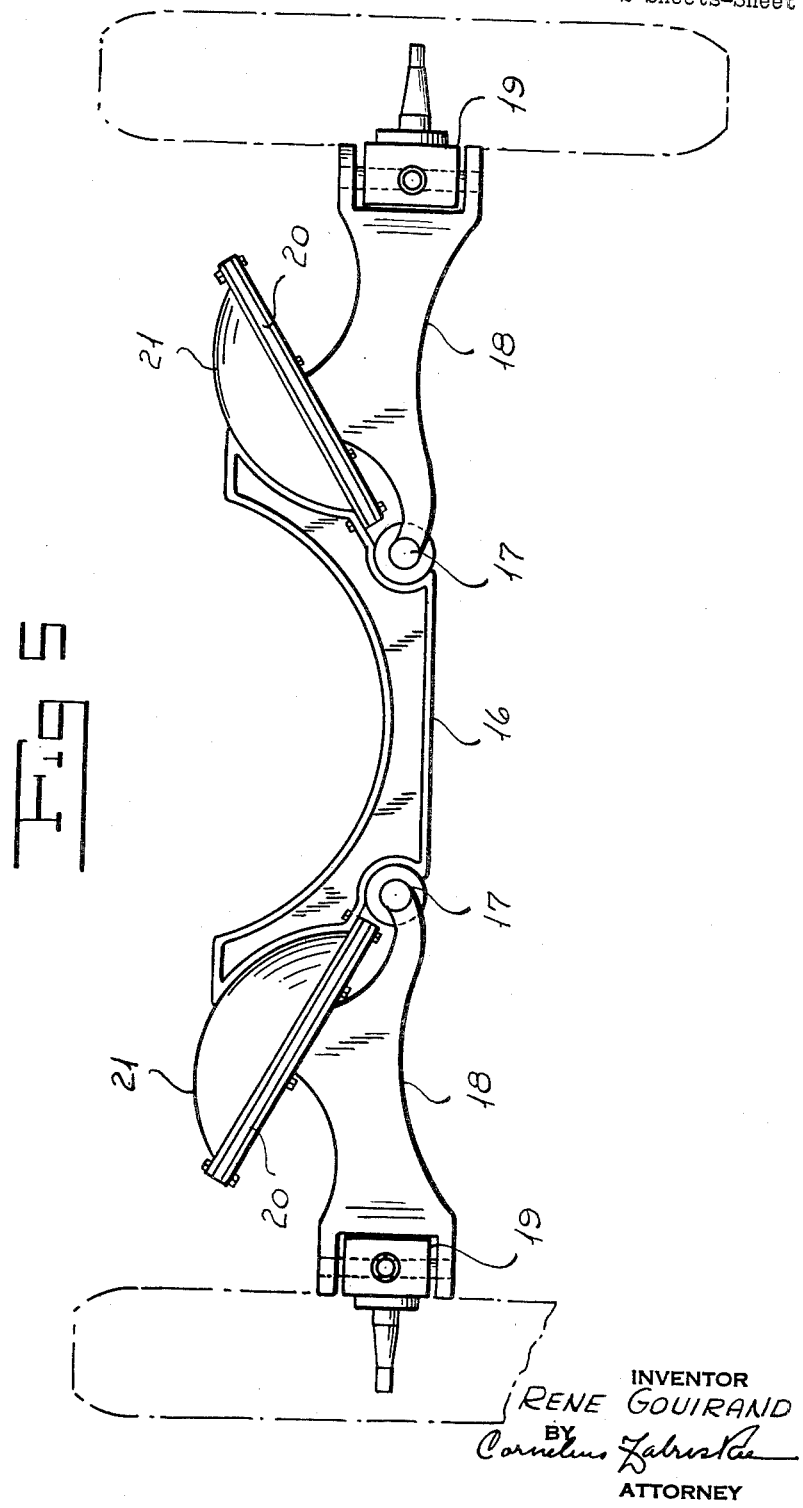
FIG. 5 is an elevation showing the suspension of FIG. 3 at both sides of the vehicle.

In the structure of FIG. 1, a housing 1 of a pneumatic chamber is supported on a cross member 2 of a chassis frame. The rear wall of the housing is provided with an opening in which is mounted a flexible diaphragm to form within the housing a hermetically sealed pneumatic chamber 4. The under side of the housing has a depending lug 5 to which is pivoted one arm of a shaped lever 6. The other arm terminates in a plate 7 overlying the outer surface of the diaphragm 3, while the elbow of the lever carries the spindle on which the wheel 8 is supported. In practice this support embodies a conventional wheel spindle and steering knuckle to permit pivotal movement of the wheel for steering purposes. The structure referred to is duplicated at the opposite sides of the chassis frame with the steering knuckles connected together in a conventional manner to permit steering of the vehicle. The pneumatic chambers 4 at the opposite sides of the vehicle may be connected by a tube 9, so as to permit the compressed fluid in the two chambers to pass to and fro between them and thus assure balanced pressures in both chambers.

In the structure of FIG. 1, the diaphragm is arranged in substantially vertical plane. In FIG. 2 the diaphragm 9 is horizontal and closes the lower side of the housing 10 of the pneumatic chamber 11. A lever 12 is pivoted to a bracket 13 on the side bar 14 of the chassis frame, while the other end of that lever carries the spindle for the wheel 15 with a steering knuckle as before. The lever 12 is connected intermediate its ends to the diaphragm 9. This structure, like the structure of FIG. 1, is duplicated at opposite sides of the vehicle.

In FIGS. 3 and 5, I have shown a highly satisfactory form of knee action pneumatic suspension. Here the front member 16 of the chassis frame carries a pivot 17 for one end of a lever 18. The other end of said lever carries a conventional steering knuckle and spindle indicated at 19, while the lever is secured intermediate its ends to a diaphragm 20. This diaphragm is inclined and is mounted on the inclined peripheral margin of the housing 21 of a pneumatic chamber 22. The housing is rigidly supported on the cross member 16 of the frame in such position that said diaphragm occupies a plane which substantially includes the axis of the pivot 17. The structure shown in FIG. 3 is also duplicated at the opposite sides of a vehicle with appropriate steering connections between the respective steering knuckles.

In each of FIGS. 1, 2 and 3, there may be a pipe or other duct connection between the pneumatic chambers at the other sides of the vehicle to permit equalization of pressures in said chambers.

The structure of FIG. 4 is primarily intended to support the rear portion of the vehicle. In this view a rear axle housing 23 at each side of the vehicle is pivotally connected by a universal joint 24 to a differential housing 24a, so that each axle housing 23 functions in effect as the lever element of the suspension. Within the differential housing are the usual differential gears which have a splined connection 25 with each rear axle 26. A universal joint 27 is included in this connection so as to permit universal movement between the rear axle housing and its enclosed axle.

Rigid with each axle housing is a plate 28 secured to the lower face of a diaphragm 29, the peripheral margin of which has a hermetic seal with the housing 30 of a pneumatic chamber 31. The housing 30 is rigidly secured to the under side of the chassis frame 32 and in this manner the chassis frame is supported above the rear axle at each side of the vehicle. Here again the pneumatic chambers at the opposite sides of the vehicle may be connected by a duct as hereinbefore indicated.

Experience has shown that in structure of FIG. 4, the connection of the rear axle housings with the diaphragm will maintain these housings in proper position without requiring the use of torque rods or other extraneous means, for these diaphragms are of laminated construction of great strength, usually of nylon fabric or chord and a synthetic rubber or plastic. Their strength is more than adequate to properly perform under all conditions.

It will be noted that in each of the structures which I have hereinbefore described, the attachment of the lever to the diaphragm is arranged off center of the latter and closer to the fixed pivot about which the lever or axle housing moves. With this arrangement, stresses on the diaphragm are equalized by providing a greater flexible area where the greater flexing actually takes place with consequently a more efficient operation of the diaphragm.

In practice, the pneumatic chambers of each of the structures described are supplied with air under pressure from any appropriate source of supply and such pressure may be regulated by any known means to effectually react against the diaphragm to support the loads impressed thereon, as will be understood by those skilled in the art.

None of the structures described requires the employment of extraneous devices, such as heavy torque rods and rigid bracing so necessary in prior pneumatic suspensions. All parts of these structures are simple, easily fabricated and of relatively low cost. Furthermore they function under remarkably low pressures, for the planetary diaphragms may be made relatively large so as to provide adequate distribution of the load which they are called upon to carry. These structures moreover require little if any maintenance. They function over extended periods without any attention whatsoever. They may be used on pleasure cars, station wagons, or trucks with equal efficiency and reliability, but it will be understood that for carrying heavy loads, the diaphragms are made heavier and larger than is required for pleasure cars.

The foregoing detailed description sets forth the invention in its preferred practical forms, but the invention is to be understood as fully commensurate with the appended claim.

Having thus fully described the invention, what I claim as new and desire to secure by Letters Patent is:

A pneumatic suspension comprising: a chassis frame having a cross member supporting at each of its ends a pneumatic chamber having a normally substantially flat flexible diaphragm facing in a direction transversely of the chassis frame, a single lever at each side of the medial plane of the frame extending transversely of the chassis frame and directly secured intermediate its ends to said diaphragm off center of the latter with one end of each lever directly pivoted to the corresponding end of the cross member and with the other end of the lever carrying a wheel spindle and serving as the sole pivotal supporting connection between a wheel on said spindle and the chassis frame, each diaphragm being positioned in inclined relation and occupying a plane substantially coincident with the axis of the corresponding lever pivot.

References Cited in the file of this patent

UNITED STATES PATENTS

| | | |
|---|---|---|
| 982,190 | Shankland | Jan. 17, 1911 |
| 2,030,710 | Opold | Feb. 11, 1936 |
| 2,133,279 | Brown | Oct. 18, 1938 |
| 2,606,019 | Smith | Aug. 5, 1952 |
| 2,862,726 | Bertsch | Dec. 2, 1958 |
| 2,874,974 | Hollert | Feb. 24, 1959 |
| 2,917,319 | Axtmann | Dec. 15, 1959 |

FOREIGN PATENTS

| | | |
|---|---|---|
| 390,033 | France | July 17, 1908 |